United States Patent [19]

Maestre

[11] Patent Number: 5,300,884
[45] Date of Patent: Apr. 5, 1994

[54] POSITION SENSING APPARATUS FOR MEASURING THE ANGULAR POSITION OF A ROTOR RELATIVE TO A STATOR HAVING A PLURALITY OF TEETH WITH EXCITATION WINDINGS AND PLURAL PHASE RECEPTION WINDINGS

[75] Inventor: Jean-Francois Maestre, Dijon, France

[73] Assignee: GEC Alsthom SA, Paris, France

[21] Appl. No.: 911,638

[22] Filed: Jul. 10, 1992

[30] Foreign Application Priority Data

Jul. 11, 1991 [FR] France ............... 91 08735

[51] Int. Cl.⁵ ............... G01B 7/30; H02K 24/00; G01D 5/20
[52] U.S. Cl. ............... 324/207.25; 310/68 B; 318/661; 324/207.17; 324/207.18
[58] Field of Search ............... 324/207.16, 207.17, 324/207.18, 207.19, 207.25, 173, 174; 310/68 B, 168; 318/652, 653, 656–661

[56] References Cited

U.S. PATENT DOCUMENTS

| | | | |
|---|---|---|---|
| 2,467,306 | 4/1949 | Habig | 324/242 |
| 4,743,786 | 5/1988 | Ichikawa et al. | 324/207.25 X |
| 4,893,078 | 1/1990 | Auchterlonie | 324/207.17 |

FOREIGN PATENT DOCUMENTS 0210927 2/1987 European Pat. Off.
2637683 4/1990 France.

OTHER PUBLICATIONS

Patent Abstracts of Japan, vol. 006, No. 171 (P-140) Sep. 4, 1982 & JP-A-57 088 317 (S G:KK) Jun. 2, 1982.

*Primary Examiner*—Gerard R. Strecker
*Attorney, Agent, or Firm*—Sughrue, Mion, Zinn, Macpeak & Seas

[57] ABSTRACT

A sensor for measuring the angular position of a rotor relative to a stator has firstly a rotor made of a magnetic material and including 2 p lobes, where p is an integer. A stator is positioned around the rotor. The stator is made of a magnetic material and includes a number of teeth equal to 2n.p, where n is the number of phases of the sensor. Each tooth is surrounded both by an excitation first winding and by reception second winding. The excitation windings are connected together in series and disposed on the teeth such that the windings on two circumferentially adjacent teeth produce magnetic flux in opposite directions. The set of said excitation windings are powered by an alternative current or voltage. The reception windings of the same phase and offset by 180 electrical degrees are connected together in series. The envelope of the signal at the terminals of each of the pairs of reception windings represent the angle of rotation of the rotor relative to the stator, to within a scaling factor.

4 Claims, 5 Drawing Sheets

POSITION SENSING APPARATUS FOR MEASURING THE ANGULAR POSITION OF A ROTOR RELATIVE TO A STATOR HAVING A PLURALITY OF TEETH WITH EXCITATION WINDINGS AND PLURAL PHASE RECEPTION WINDINGS

The present invention relates to apparatus for measuring the angular position of a rotor relative to a stator.

In a particularly advantageous, but non-exclusive application, the invention may be used in the field of electric motor control.

BACKGROUND OF THE INVENTION

In French Patent No. 88 13 272, the Applicant describes apparatus for measuring the angle of rotation of a rotor of a motor relative to the stator thereof, which apparatus comprises 2n magnetic sensors disposed on a circumference that is fixed relative to the stator, n being the number of phases of the motor, each sensor comprising a magnetic circuit equipped with a transmission winding and a reception winding, the sensors being grouped together in pairs, the sensors in the same group being offset by 180 electrical degrees, the groups being uniformly offset from one another by a geometrical angle equal to k.360/2p, where k is an arbitrary number, and p is the number of pairs of poles of the motor, all the transmission windings being connected together in series and powered by an AC voltage lying in the range 2 kHz to 15 kHz, the reception windings in the same group of sensors being connected together in series, the envelope of the signals at the terminals of the sets of reception windings representing, to within one phase-shift, the image of the measurement of the angle of rotation of said rotor.

An embodiment of that sensor is described in detail in the French Certificate of Addition No. 89 10 533.

Such a sensor operates well but is relatively expensive to make, in particular for sensors used with motors having small numbers of poles (e.g. below six poles).

An aim of the present invention is to provide a sensor which costs less, in particular for sensors having small numbers of pairs of poles, while maintaining the same accuracy and the same operating safety.

SUMMARY OF THE INVENTION

The invention provides a sensor for measuring the angular position of a rotor relative to a stator, wherein said sensor comprises firstly a rotor made of a magnetic material and including 2p lobes, where p is an integer, and secondly, around the rotor, a stator made of a magnetic material and including a number of teeth, which number is equal to a multiple of 2n.p, where n is the number of phases of the sensor, each tooth being surrounded both by an "excitation" first winding and by "reception" second winding, the excitation windings being connected together in series and disposed on the teeth such that the windings on two circumferentially adjacent teeth produce magnetic flux in opposite directions, the entire set of said excitation windings being powered by an alternating current or voltage, the pairs of reception windings relating to the same phase and offset by 180 electrical degrees being connected together in series, the envelope of the signal at the terminals of each of the pairs of reception windings representing the angle of rotation of said rotor relative to said stator to within a scaling factor.

Advantageously, the various pairs of reception windings relating to the same phase are all connected together in series.

BRIEF DESCRIPTION OF THE DRAWINGS

An embodiment of the invention is described by way of example with reference to the accompanying drawings, in which.

DETAILED DESCRIPTION

Figure 1:
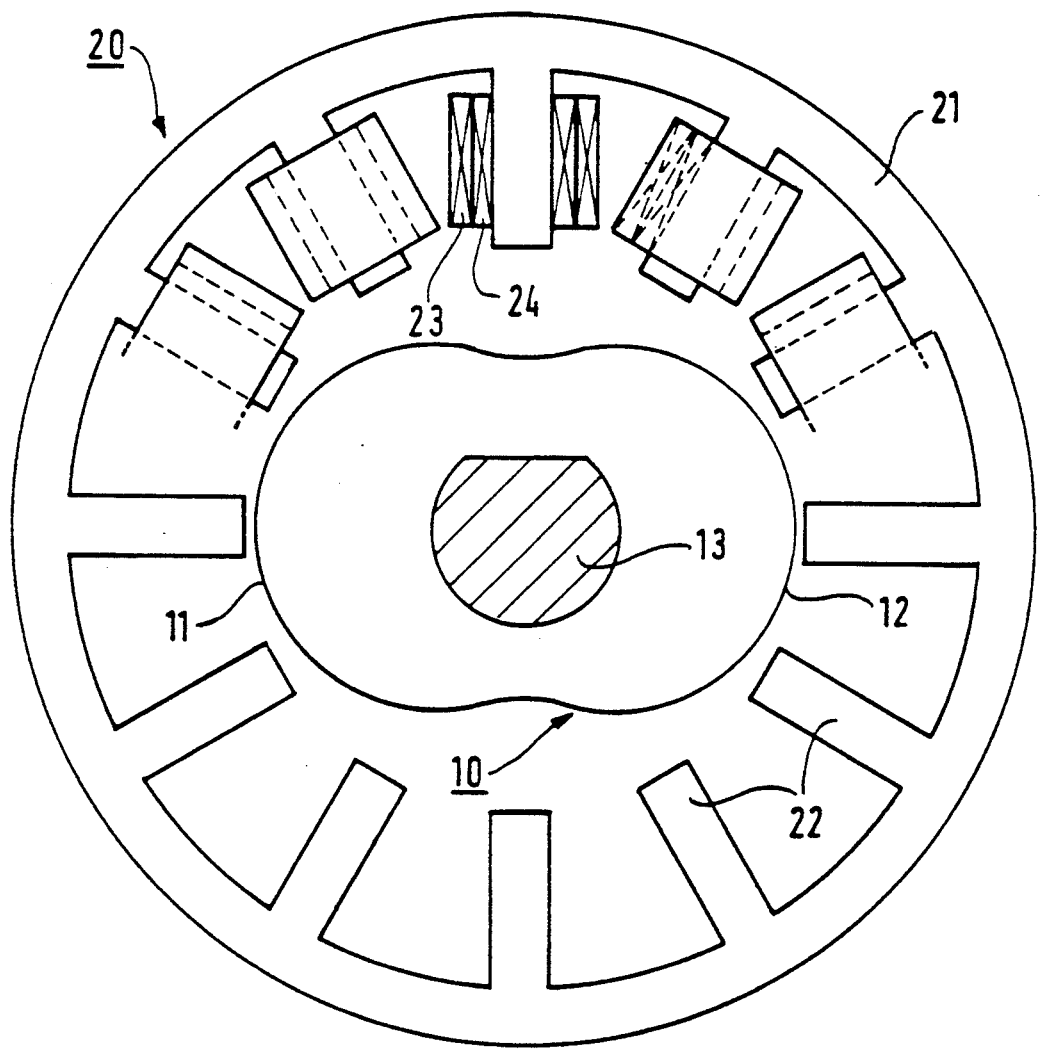
FIG. 1 is a diagram showing the principle of a sensor of the invention having three phases and four poles.

FIG. 1 shows the principle of the sensor of the invention. The embodiment chosen is a 4-pole sensor.

The sensor of the invention comprises a rotor 10 and a stator 20.

The rotor 10 includes two lobes 11 and 12, i.e. one lobe per pair of poles. The rotor is made up of a stack of magnetic laminations, and the shape given to the laminations is selected so that flux variation in the air gap is as close as possible to a sine curve.

Advantageously, the rotor has a central opening 13 to enable it to be keyed on the shaft of a motor to be controlled.

The stator is also formed of a stack of magnetic laminations, and it comprises a ring 21 and a plurality of teeth 22 which are rectangular in cross-section, and which point inwards. In the embodiment described, there are twelve such teeth. More generally, the number of teeth is a multiple of the product 2n.p, where n is the number of phases of the sensor, and p is the number of pairs of poles of the sensor.

Each tooth has two windings such as 23 & 24, preferably disposed coaxially. FIGS. 2 to 7 concern a two phase four pole sensor, for which the stator has eight teeth as shown in FIG. 6.

Figure 2:
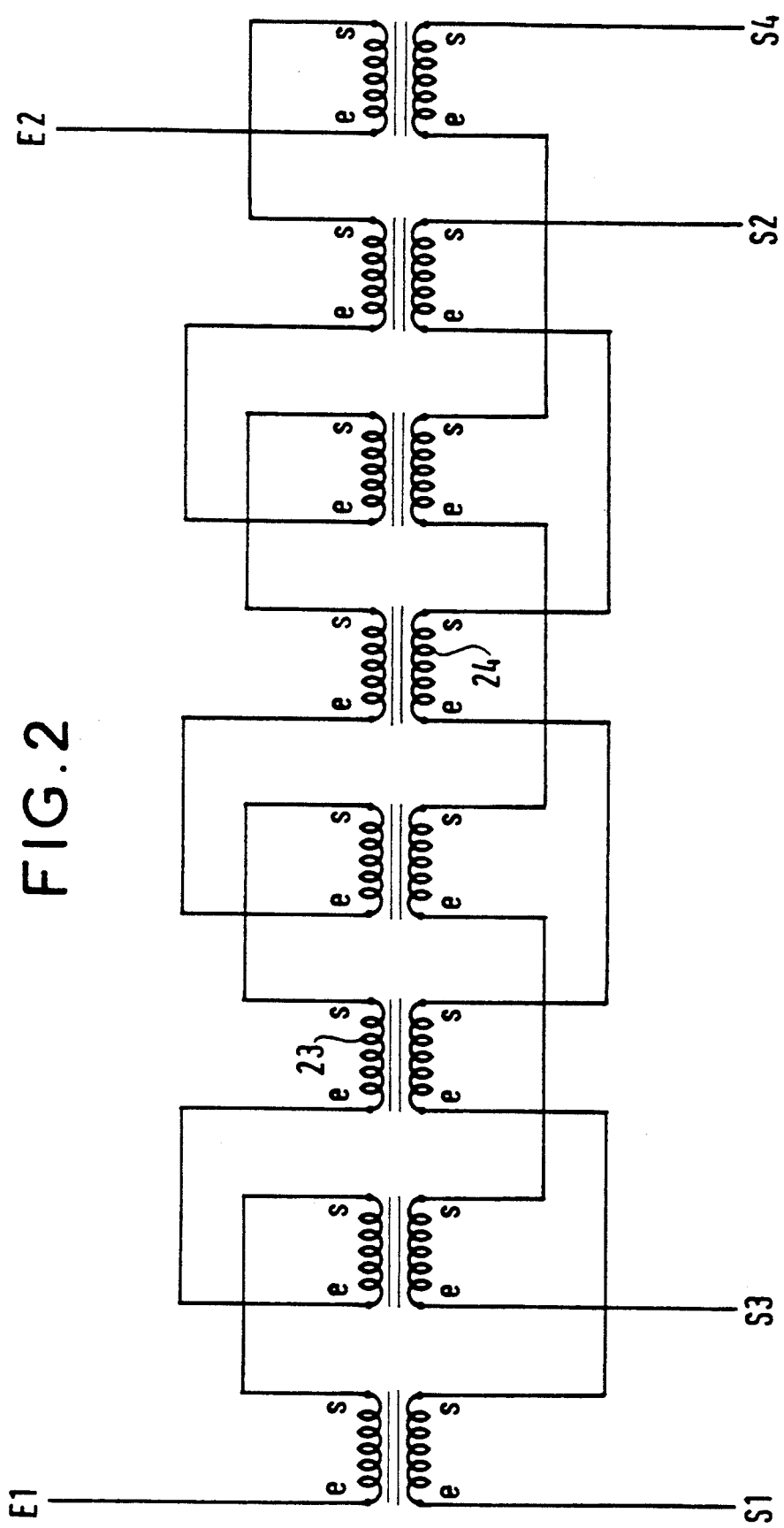
FIG. 2 is a diagram of a sensor having two phases and four poles showing how the windings of the sensor of the invention are connected together.

The windings 23 are referred to as "transmission" windings, and they are all connected together in series, with the entire set of transmission windings being connected to a source E1E2 of alternating current or voltage having a frequency preferably lying in the range 1 kHz to 10 kHz (FIG. 2). The input e of the transmission winding on any given tooth is connected to the input e of the transmission winding on an adjacent tooth, so that the transmission windings on said two teeth transmit flux in opposite directions. The output s of any given transmission winding is connected to the output s of the transmission winding on an adjacent tooth.

The invention provides a sensor for measuring the angular position of a rotor relative to a stator, wherein the sensor comprises firstly a rotor made of a magnetic material and including p lobes, where p is an integer, the number of lobes being defined by the number of regions of the rotor where the distance between the rotor and the inner diameter of the stator is a minimum. Thus a sensor whose rotor comprises p lobes is a 2-p-pole sensor and there are p electrical degrees in one mechanical degree. Secondly, around the rotor the stator made of magnetic material includes a number of teeth whose number is equal to 2.n.p, where n is the number of electrical phases of the sensor, a phase being an output of the sensor, each tooth being surrounded both by an excitation first winding and a reception second winding. Two windings constitute a coil. The entire set of excitation windings are connected together for each phase in series and are wound in a direction such that the whole excitation windings of the sensor produce in two circumferentially adjacent teeth, magnetic fluxes in opposite directions. In this way, two adjacent excitation windings are wound in contrary directions. Each phase comprises 2.p reception windings. Two circumferentially adjacent reception windings relating to the same phase are offset by 180 electrical degrees. The 2.n.p teeth of a stator constitute 2.p poles. Each pole comprises n adjacent teeth in succession. Around the first tooth of a pole, a reception winding of the first phase is set, the second phase is set, and so on up to the phase and the last pole. The reception windings relating to the same phase are connected in series and when n is an odd number, the entire set of reception windings relating to the same phase are wound in a same direction and when n is an even number, two reception windings relating to the same phase, which are offset by 180 electrical degrees are wound in opposite directions. When the entire set of the excitation windings is powered by an alternating voltage or current, there is in each tooth a magnetic flux, whose amplitude is high when the distance between the tooth and the rotor is short and low when that distance is long. The distance is short when the lobe faces the tooth. The voltage at the terminal of a reception winding is proportional to the flux in the tooth. Further, with respect to the embodiment of the invention illustrated in FIG. 1, the stator may be formed of a stack of magnetic laminations comprised of a ring 21 and a plurality of radially projecting teeth 22 which are rectangular in cross-section and project radially inward. In that embodiment, there are twelve such teeth where the number of teeth is 2n.p, where the number n is the number of phases of the sensor and p is the number of lobes of the sensor rotor. Each tooth has two windings as at 23, 24, preferably disposed coaxially.

Figure 3:
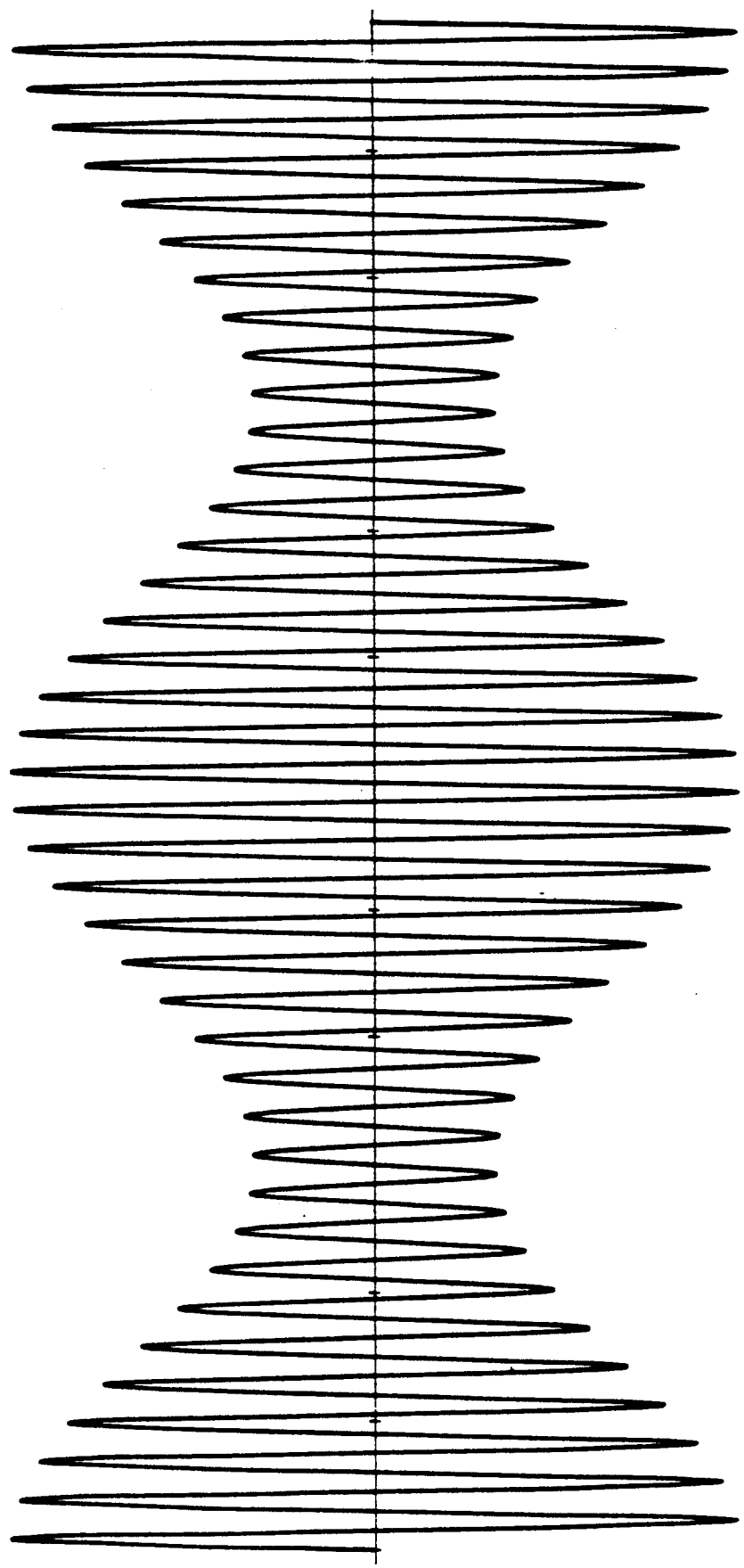
FIG. 3 is a waveform diagram showing the signal at the terminals of a reception winding of the sensor of FIG. 2.
Figure 4:
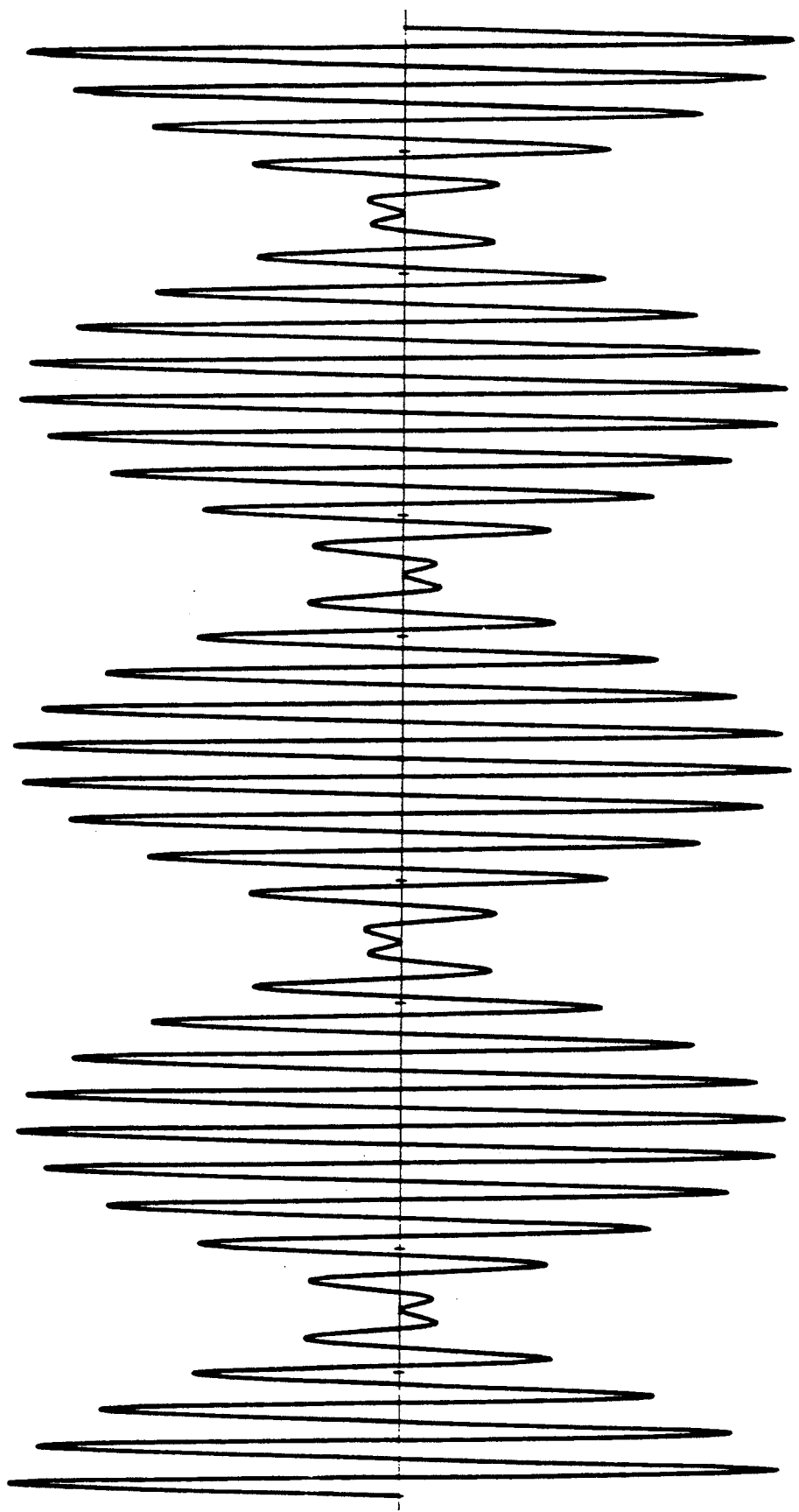
FIG. 4 is a waveform diagram showing the signal picked up at the terminals of the circuit constituted by two reception windings offset by 180 electrical degrees from each other.

In the embodiment of FIGS. 2-7 inclusive, this embodiment is a 2 phase 4 pole sensor for which the stator has 8 teeth as shown in FIG. 6. The windings 23 are excitation windings. They are all connected together in series and the entire set of excitation windings is connected to a source E1, E2 of alternating current or voltage having a frequency preferably lying in the range of 1 kHz to 20 kHz, FIG. 2. The excitation windings are connected in series with the polarity alternating from one tooth to the next circumferentially so that the excitation windings on two circumferentially successive teeth transmit flux in opposite directions. The output s of any given reception winding is connected to the output s of the reception winding of an adjacent tooth. FIG. 3 shows the voltage at the terminals of a reception winding 24. The signal of FIG. 4 is one in which the DC component and the even harmonics have been removed and is obtained by connecting together the entire set of reception windings of an electrical phase.

FIG. 3 shows the voltage at the terminals of a reception winding 24.

The signal shown in FIG. 4 from which the DC component and the even harmonics have been removed is obtained by connecting together in series two reception windings that are offset by an electrical angle of 180 degrees. The envelope of the signal gives the angle of rotation of the rotor relative to the stator from an arbitrary origin and to within a scaling factor.

In the embodiment shown in FIG. 2, all the windings offset by 180 electrical degrees are connected in series, thereby making it possible to pick up two signals, one between the terminals S1 and S2, and the other between the terminals S3 and S4, the two signals being out of phase by 90 electrical degrees. The sensor thus provides the equivalent of a two-phase multipolar resolver.

If the stator were provided with 12 teeth, a sensor equivalent to a three-phase multipolar resolver would be obtained.

The sensor of the invention enables a motor to be controlled without electronics being placed on the motor itself.

Currently, controlling a "trapezoidal wave" motor requires Hall-effect sensors to be present on the motor to measure the position of the rotor relative to the stator. Furthermore, it is essential to have a tachometer in order to detect the speed of the motor and to vary said speed.

Using the sensor of the invention enables the motor to be controlled without any electronics being installed on-board the motor. It is possible to make the required control signals from the sensor signals by means of an electronic circuit which can be located at a distance from the motor, and consequently remote from disturbances due to vibration and overheating.

In order to control "sinewave" motors which are currently controlled by resolvers supplying motor speed and rotor position relative to the stator, the sensor of the invention can be used directly, providing it has the same number of poles as the motor, and therefore without requiring a polarity-matching circuit, as is required with a resolver.

Figure 5:
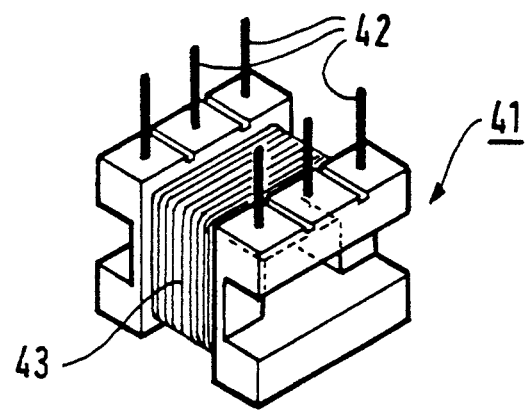
FIG. 5 to FIG. 7 show the technology used to make the stator.
Figure 6:
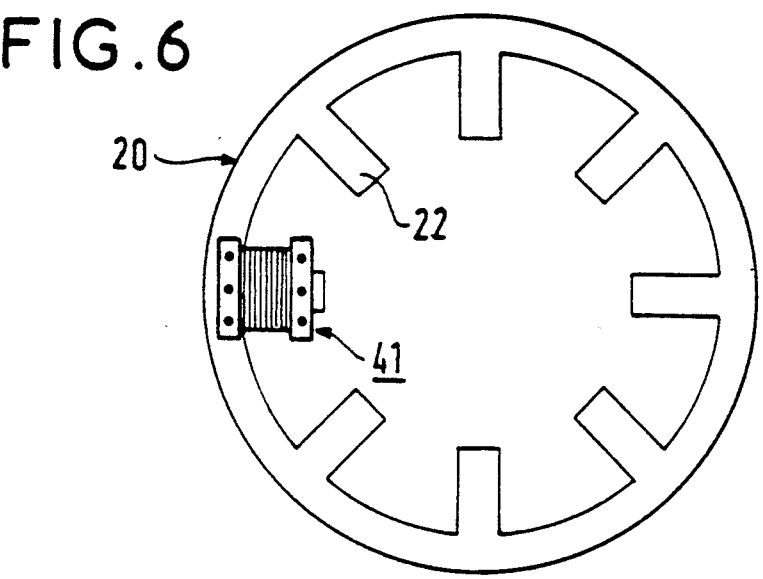
Figure 7:
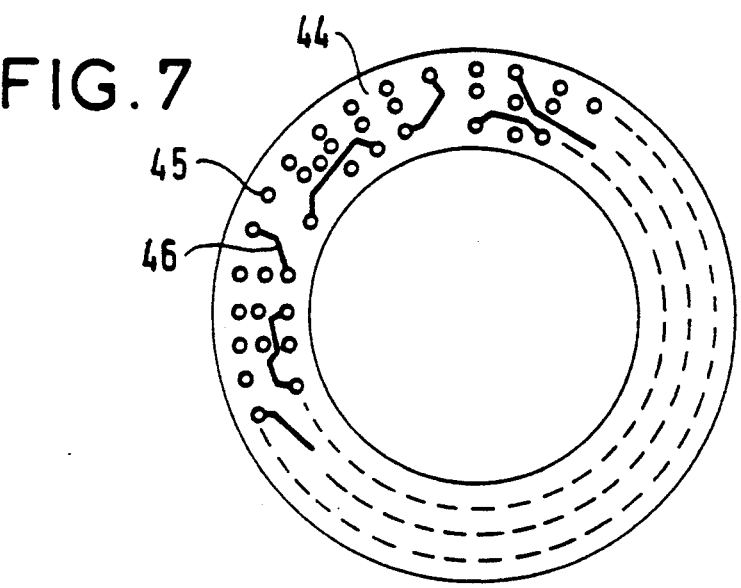

FIGS. 5 to 7 show various components used to make the stator of the sensor.

The stator winding is made using a plastic former 41 equipped with fixing and connecting pins 42.

After the wire has been wound around the former and the connections have been soldered to the pins (FIG. 5), the windings are threaded onto the teeth of the magnetic circuit (FIG. 6).

The resulting assembly is plugged into a ring-shaped printed circuit board 44 including holes 45 for receiving the pin ends, certain holes being joined together via conductive deposits 46 making the necessary electrical connections (FIG. 7).

This technology enables the stator of the sensor to be installed very quickly, and the cost of the stator is consequently acceptable.

The invention applies to making sensors for controlling all sizes of motor, an in particular small motors.

Furthermore, the sensor may be used in a motor having its rotor immersed in a hydraulic liquid, the rotor of the sensor being immersed with the rotor of the motor.

I claim:

1. A sensor for measuring the angular position of a rotor relative to a stator, comprising a rotor made of a magnetic material and including p lobes, where p is an integer greater than one, a stator disposed around the rotor and made of a magnetic material and including a number of teeth, said number being equal to 2n.p, where n is the number of electrical phases of the sensor and greater than one, each tooth being surrounded both by an excitation first winding and a single reception second winding corresponding to one of said n phases, the excitation windings being connected together in series and disposed on the teeth such that the windings on two circumferentially adjacent teeth produce magnetic flux in opposite directions, the entire set of said excitation windings being powered by an alternating current or voltage, the reception windings relating to a same phase being connected in series and when n is an odd number, the entire set of reception windings relating to the same phase being wound in a same direction and when n is an even number, two reception winding relating to the same phase which are offset by 180 electrical degrees, being wound in opposite directions, each reception winding relating to the same phase being wound on every $n^{th}$ tooth and the windings of each phase being displaced one tooth from the windings of another phase, the envelope of the signal at the terminals of a phase representing the angle of rotation of said rotor relative to said stator to within a scaling factor.

2. A sensor according to claim 1, wherein the transmission winding and the reception winding on each tooth are disposed coaxially.

3. A sensor according to claim 1, wherein each transmission winding and each reception winding is wound on a former equipped with pins, said formers with said windings are concentrically mounted on the teeth respectively in the stator magnetic circuit, and the pins of said formers are positioned and soldered in holes of a printed circuit equipped with connection links.

4. A sensor according to claim 1, wherein the excitation windings are connected to an AC power source having a frequency lying in the range of 1 kHz to 20 kHz.

* * * * *